Dec. 23, 1930.  A. HIGHTOWER  1,786,241
CROSS-ROW COTTON CHOPPER AND CULTIVATOR
Filed Aug. 3, 1929   2 Sheets-Sheet 1
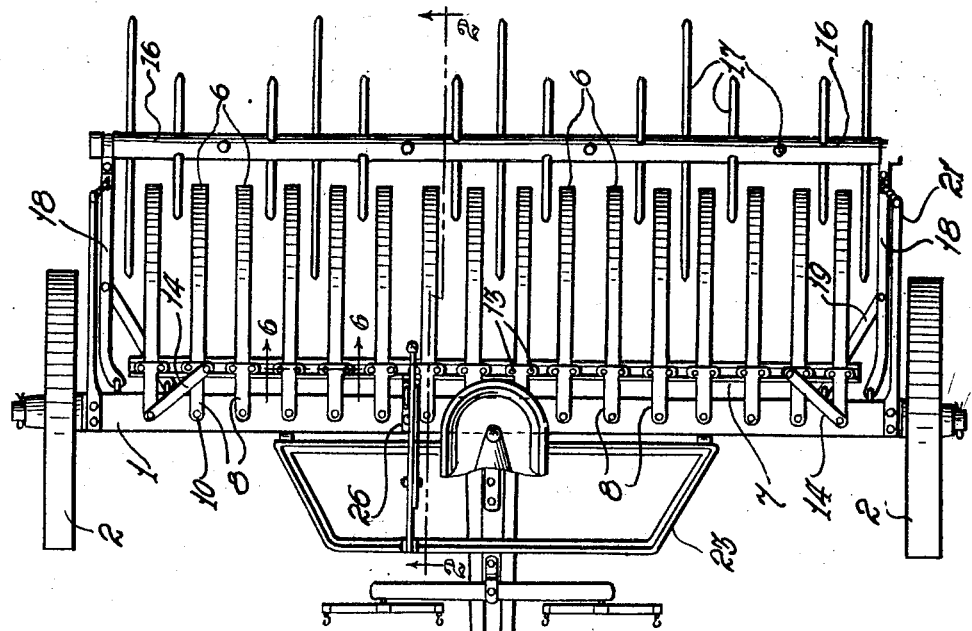
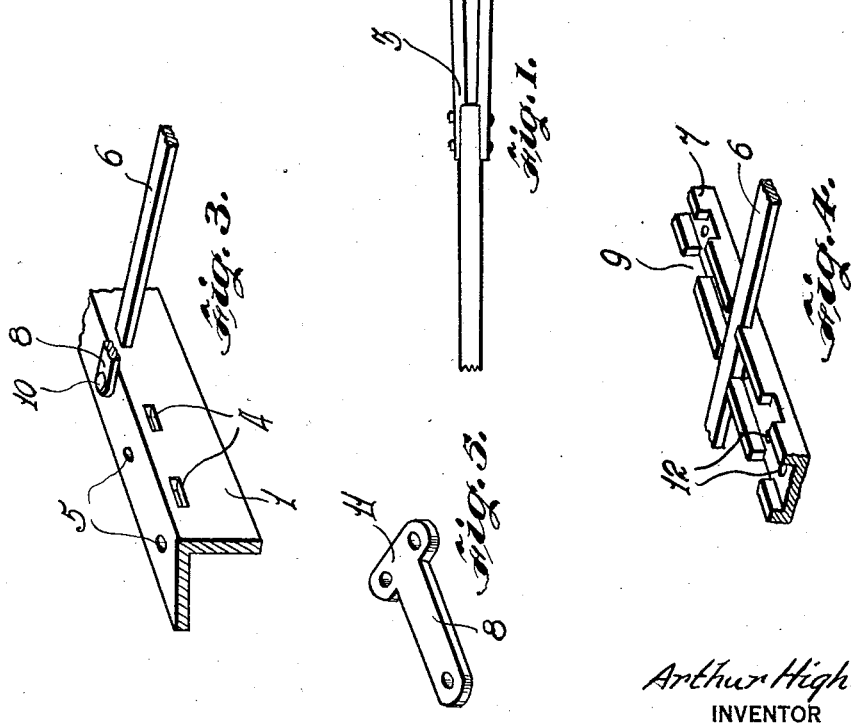
Arthur Hightower,
INVENTOR
BY John M. Spellman
ATTORNEY Dec. 23, 1930.  A. HIGHTOWER  1,786,241
CROSS-ROW COTTON CHOPPER AND CULTIVATOR
Filed Aug. 3, 1929  2 Sheets-Sheet 2
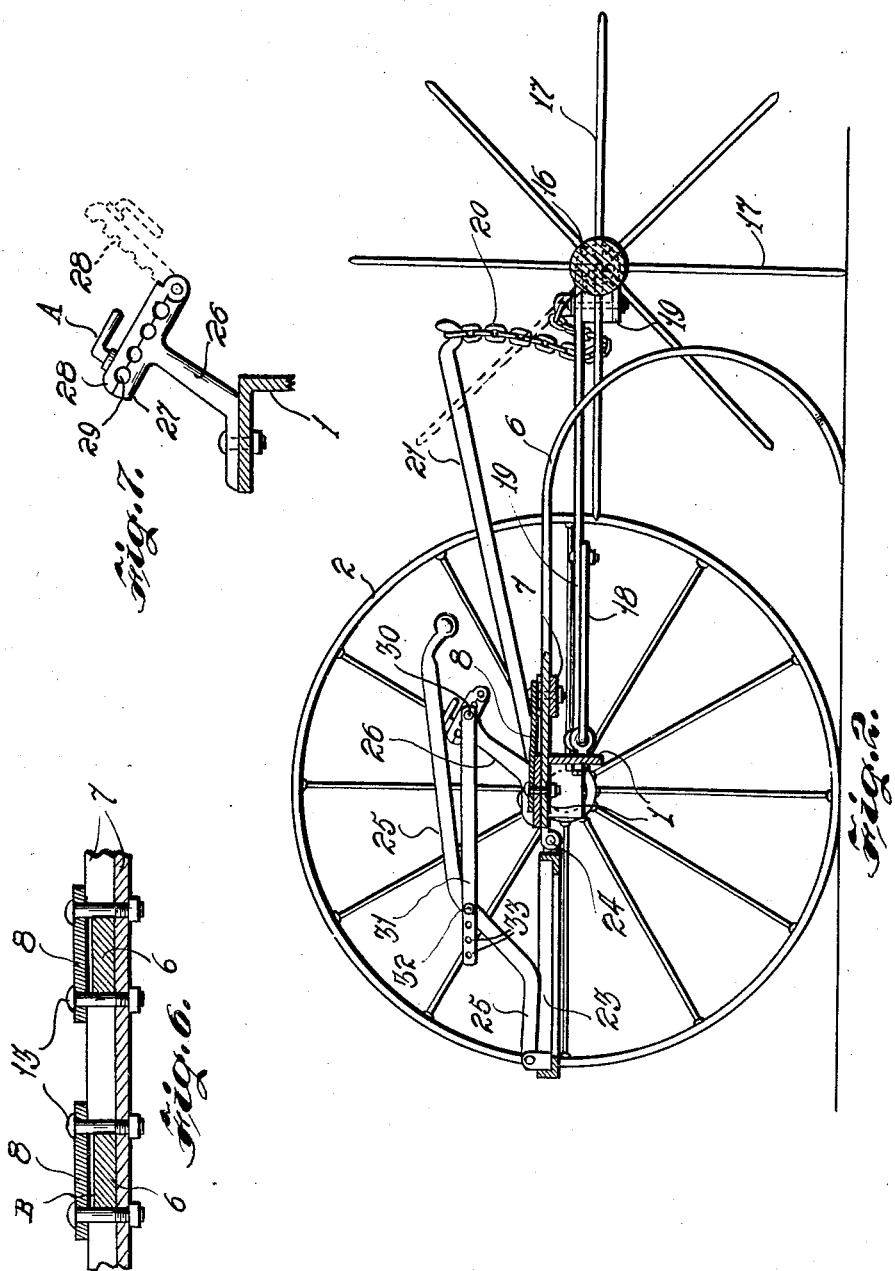
Arthur Hightower,
INVENTOR
BY John M. Spellman
ATTORNEY Patented Dec. 23, 1930

1,786,241

UNITED STATES PATENT OFFICE

ARTHUR HIGHTOWER, OF FROST, TEXAS

CROSS-ROW COTTON CHOPPER AND CULTIVATOR

Application filed August 3, 1929. Serial No. 383,289.

This invention relates to agricultural implements and refers more particularly to new and novel improvements in weeding, cultivating and spacing elements for farm vegetation, preferably cotton.

The primary object of this invention is to provide a simple, practical and durable machine for cross-row cultivation, particularly of cotton.

Another particular object of the invention is its novel mechanism whereby the cultivating blades are prevented from being clogged with vegetation, and the means for adjusting the cutting depth of the blades.

A further object of the invention is the means for throwing the cultivating blades and blade cleaning means out of operative position.

With the above and other objects in view the invention will be clearly understood from a perusal of the following detailed description, taken in connection with the accompanying drawings forming part of this specification, and wherein:

Figure 1 is a top plan view of the implement embodying the invention,

Figure 2 is a cross-sectional view, the view taken along the line 2—2 of Figure 1, Figures 3, 4 and 5 are detail perspective views respectively of different parts of the machine, and illustrate the manner of connecting the cultivating blades onto the axle, Figure 6 is a partial longitudinal sectional view of Figure 1 taken along the line 6—6 thereof showing two of the blades in assembled position, and Figure 7 is a detail view of the means for holding the blades in adjustable position.

Proceeding in accordance with the drawings, 1 denotes the axle of the implement, the axle being of angle iron and supported by the wheels 2 of conventional type. The tongue is indicated at 3.

The axle 1 is provided with spaced slots 4 and holes 5 whereby the goose-neck blades 6 are held in spaced relation onto the axle. To the rear of and parallel to the axle is a channel bar 7, shown in detail in Figure 4. This bar enables the blades 6 to be maintained in spaced parallel relationship with each other and also permits vertical play of the blades in the space B. This vertical movement is arranged by means of the T plates 8, in connection with the channel bar 7. In Figure 4 is shown the manner of spacing the blades 6 in the bar, the bar having spaced notches 9 in which the blades are set. The shanks or longer ends of the T plates are bolted to the axle 1 as shown in Figure 3 by the bolts 10. The blades are first thrust through the axle through the slots 4 then the T plates are placed onto the axle, the short right angled portion 11 of the plates being aligned with the holes 12. The portion 11 then lies in the channel of the bar 7, and the blades are thus firmly held in position by the bolts 13 in connection with the bolts 10.

Brace links 14 are also connected to one or more of the blades and also to the T plates and channel iron to hold the parts in rigid position onto the axle.

To the rear of the blades 6 is a shaft 16 having spaced and pointed rods 17 for the purpose of raking or drawing vegetation and weeds removed and cut by the blades from between the blades as the latter travel across the rows. This shaft may be termed a walking beam, the rods 17 being supported on the ground and traveling along in a step-by-step motion as the implement is drawn through the field. This shaft or walking beam is fastened to the axle loosely by the rods 18 as clearly shown in Figure 1. Connected to the beam or shaft 16 is a member 19 carrying a chain 20. The chain is attached to a lever 21 the latter fastened to the axle 1. When the axle is tilted from normal operative position (as hereinafter described) the chain takes up its slack, becoming taut and the rods 17 are lifted from the soil.

The means for accomplishing the turning or tilting movement of the axle is by a frame 23, pivoted centrally to the axle 1 at 24. To this frame is pivotally connected a lever 25. Rigidly connected to the axle about the center thereof is a member 26. This member has a pair of jaws 27 and 28 with spaced notches 29 for reception of a pin 30. The pin is carried on a bar 31. A member A locks the jaws together. The lever 25 is apertured for a bolt or pin 32 which connects the lever 25 to the bar 31. By this arrangement the apertures 33 and notches 29 permit adjustment of the cutting or cultivating depth of the blades 6, as obviously when the bar 31 is placed so as to connect with different notches in the jaws or set in the various apertures in the bar, the frame 23 will be moved higher or lower from a horizontal position, thus moving the blades up or down. The blades and walking beam are held in operative position by the lever 25, the lever being shown in normal operative position in Figure 2.

When it is desired to lift the blades 6 and shaft or beam 16 clear of the soil the lever 25 is moved upwardly. This will tilt the axle forward, incline the frame 23 and throw the member 26 forward. The blades then rise from contact with the soil and when sufficiently high the lever 21 being rigidly connected to the axle, will take up the slack of the chain. When the chain becomes taut the shaft or beam 16 will be lifted, thus raising the rods 17 clear.

The invention is not to be understood as limited to the present disclosure, as alterations and changes are possible such as will come within the scope and meaning of the appended claims.

What is claimed as new is:

1. A cross-row cotton chopper and cultivator comprising an axle having a plurality of goose-neck blades rigidly attached to the axle; a channel bar disposed to the rear of connected to and parallel with said axle, said blades having a loose connection through said channel bar to afford a free vertical play of the blades; a walking beam carrying pointed rods, said beam disposed to the rear of the channel bar and having connection with said axle; said pointed rods normally projecting between said blades and adapted to pull and retrieve the vegetation dislodged by the blades from between the blades to retain the latter in clean cutting condition, said axle including a frame loosely connected to the front side thereof, a lever pivoted to the frame, a member rigidly connected to the axle and including notched jaws; an element connecting the lever to the member carrying the jaws; said lever when raised adapted to tilt the axle forwardly, thereby lifting the blades out of the soil; said element connecting the lever to the member carrying the jaws including spaced holes, the jaws and holes permitting adjustment of the lever and jaw member to set the blades at desired depth in the soil.

2. A cross-row cotton chopper and cultivator comprising an axle, wheels supporting the axle, a plurality of blades connected to the axle, a walking beam carrying spaced and pointed rods disposed behind the blades; means for adjusting the blades to desired cutting depth in the soil; and means for simultaneously lifting the blades and walking beam clear of the soil, said walking beam being connected to said axle by members at each end of the beam to hold the latter in spaced relation to the axle, said member including a flexible element and a lever, the lever being rigidly fastened to the axle, said flexible element being connected to the beam and the outer end of the lever; said beam being lifted upwardly when the flexible element becomes taut by the forward tilting of the axle.

In testimony whereof I affix my signature.

ARTHUR HIGHTOWER.